(12) United States Patent
Geary et al.

(10) Patent No.: US 8,781,126 B2
(45) Date of Patent: Jul. 15, 2014

(54) METHOD, APPARATUS AND COMPUTER PROGRAM PRODUCT FOR PROVIDING SECURITY DURING HANDOVER BETWEEN A PACKET-SWITCHED NETWORK AND A CIRCUIT-SWITCHED NETWORK

(75) Inventors: Stuart Geary, Fleet (GB); Luis Miguel Santos Barreto, Camberley (GB); Simone Provvedi, Middlesex (GB); Steven Franklin, Guildford (GB); Keiichi Kubota, Weybridge (GB)

(73) Assignee: Nokia Corporation, Espoo (FI)

( * ) Notice: Subject to any disclaimer, the term of this patent is extended or adjusted under 35 U.S.C. 154(b) by 659 days.

(21) Appl. No.: 12/610,653

(22) Filed: Nov. 2, 2009

(65) Prior Publication Data

US 2010/0220862 A1 Sep. 2, 2010

Related U.S. Application Data

(60) Provisional application No. 61/110,621, filed on Nov. 3, 2008.

(51) Int. Cl.
*H04K 1/00* (2006.01)
*H04L 9/00* (2006.01)
*H04L 9/32* (2006.01)
*G06F 17/30* (2006.01)
*G06F 15/16* (2006.01)

(52) U.S. Cl.
USPC ............. 380/272; 380/44; 713/168; 713/171; 726/2; 726/3; 726/4

(58) Field of Classification Search
USPC ................. 713/150–159, 160–167, 189–193; 709/229; 380/28–30, 44–47, 255–286
See application file for complete search history.

(56) References Cited

U.S. PATENT DOCUMENTS 6,671,507 B1 12/2003 Vinck
(Continued)

FOREIGN PATENT DOCUMENTS

CN 101056167 A 10/2007
(Continued)

OTHER PUBLICATIONS

Rajavelsamy, R. et al., *Security Aspects of Inter-Access System Mobility Between 3GPP and Non-3GPP Networks*,(invited paper), Communication Systems Software and Middleware and Workshops, 2008, COMSWARE 2008, IEEE, Jun. 2008, [online], [retrieved on Jul. 18, 2007]. Retrieved from the Internet <DOI: 10.1109/COMSWA.2008.4554410>, 5 pages.

(Continued)

*Primary Examiner* — Evans Desrosiers
(74) *Attorney, Agent, or Firm* — Alston & Bird LLP

(57) ABSTRACT

A method, apparatus and computer program product are provided to facilitate security in response to a handover from an initial network to a subsequent network, such as a handover between a packet-switched network and a circuit-switched network. The method, apparatus and computer program product may provide at least one security key for use in the subsequent network following handover from the initial network such that communications conducted via the subsequent network, including initial communications, may be secure. In order to provide at least one security key for use in the subsequent network, at least one security key of the initial network may be identified along with a nonce in response to a determination that a handover is to be made. The at least one security key of the subsequent network may then be determined based upon the at least one security key of the initial network and the nonce.

20 Claims, 5 Drawing Sheets

(56) References Cited

U.S. PATENT DOCUMENTS

| | | | |
|---|---|---|---|
| 7,353,388 B1* | 4/2008 | Gilman et al. | 713/168 |
| 2004/0228491 A1* | 11/2004 | Wu | 380/272 |
| 2004/0246990 A1* | 12/2004 | Krishnamurthi et al. | 370/466 |
| 2005/0176431 A1 | 8/2005 | Herrero Veron | |
| 2009/0307496 A1* | 12/2009 | Hahn et al. | 713/171 |

FOREIGN PATENT DOCUMENTS

| | | |
|---|---|---|
| EP | 1 103 137 B1 | 12/2000 |
| EP | 1 562 340 A1 | 8/2005 |
| WO | WO 2008/023162 A2 | 2/2008 |
| WO | WO 2009/080480 A1 | 7/2009 |

OTHER PUBLICATIONS

International Search Report and Written Opinion for International Application No. PCT/FI2009/050881 mailed Apr. 16, 2010.

Office Action for Chinese Application No. 200980143395.8 dated Feb. 11, 2014.

Office Action for Chinese Application No. 200980143395.8; dated Nov. 1, 2013.

* cited by examiner

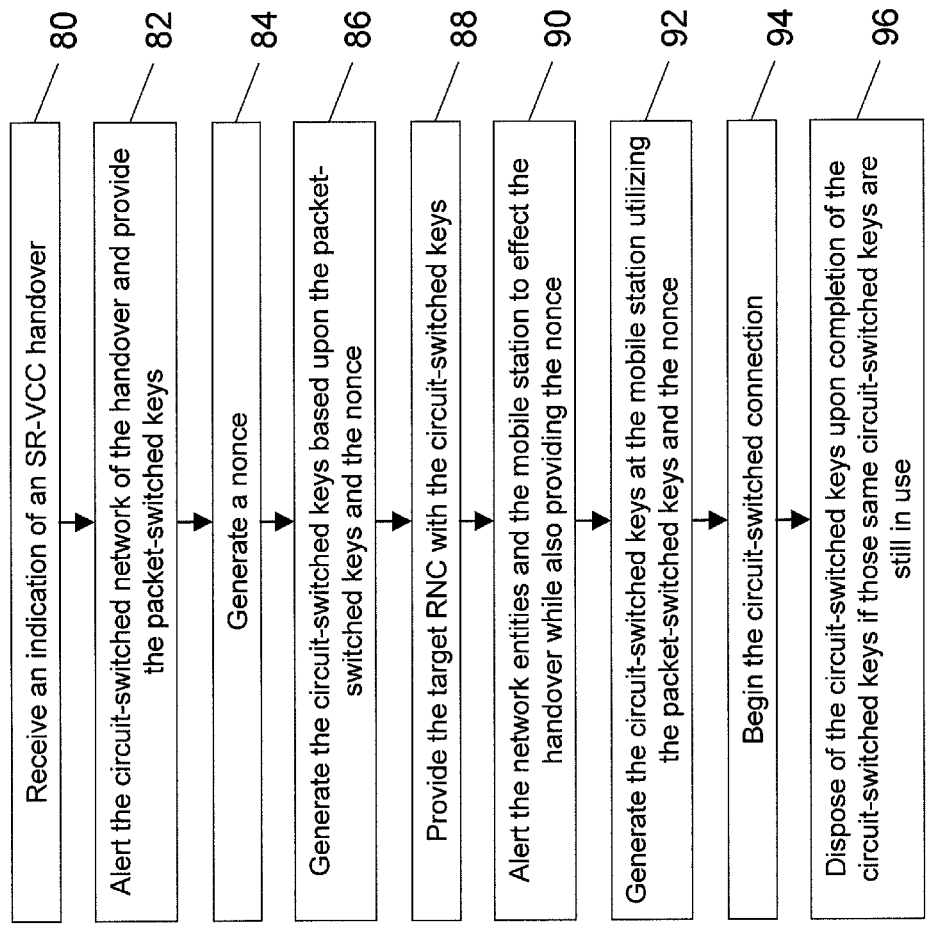

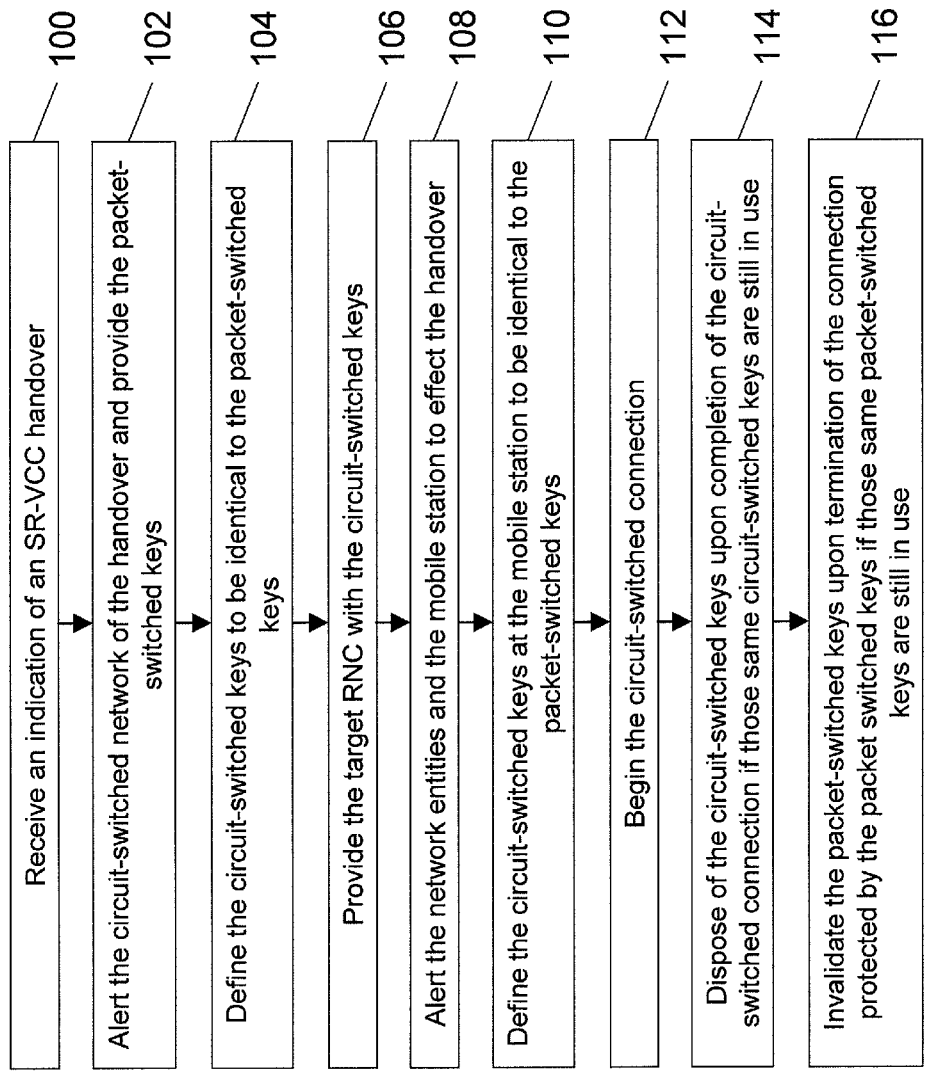

METHOD, APPARATUS AND COMPUTER PROGRAM PRODUCT FOR PROVIDING SECURITY DURING HANDOVER BETWEEN A PACKET-SWITCHED NETWORK AND A CIRCUIT-SWITCHED NETWORK

CROSS-REFERENCE TO RELATED APPLICATION

The present application claims priority from U.S. Provisional Patent Application No. 61/110,621 filed Nov. 3, 2008, the contents of which are incorporated herein.

TECHNOLOGICAL FIELD

Embodiments of the present invention relate generally to handover between a packet-switched network and a circuit-switched network and, more particularly, to the definition of security keys in response to a determination of the handovers to be made between the packet-switched network and a circuit-switched network.

BACKGROUND OF THE INVENTION

Voice communication is evolving from circuit-switched technology, such as provided by the Public Switched Telephone Network (PSTN) or Public Land Mobile Network (PLMN), to packet-switched technology, such as provided by Voice over IP (VoIP) techniques across Internet Protocol (IP) networks. At the same time, wireless networks are evolving from circuit-switched voice networks (e.g., GSM (Global System for Mobile communications), IS-136 (Time Division Multiple Access (TDMA)), and IS-95 (Code Division Multiple Access (CDMA))) to packet-switched networks (e.g., WLAN (Wireless Local Area Network), UMTS (Universal Mobile Telecommunication System), and CDMA2000) capable of supporting multimedia applications to mobile end-users over IP. General Packet Radio Service (GPRS), which is an evolution of GSM, can support packet data (e.g., web browsing, email, etc.) in a cellular environment. Further evolution of GPRS, often referred to as UMTS, is expected to support real-time multimedia over IP (e.g., VoIP, video over IP, streaming media, etc.) in a cellular environment. In addition, the Third Generation Partnership Project (3GPP) has specified the IP Multimedia Subsystem (IMS) to accomplish the control and service functions of wireless IP multimedia. In this regard, the 3GPP has adopted Session Initiation Protocol (SIP) as the signaling protocol in IMS.

With the availability of both packet-switched networks and circuit-switched networks, voice calls must sometimes be handed over from one type of network, such as a packet-switched network or a circuit-switched network, to the other type of network. For example, the 3GPP includes a single radio voice call continuity (SR-VCC) feature for allowing a voice call to be handed over from a packet-switched connection to a circuit-switched connection, for example, thereby permitting a VoIP call over a data bearer to be handed over to a traditional voice call over a circuit-switched bearer. As such, VoIP services can be more widely utilized by providing inter-working between circuit-switched networks and packet-switched networks.

In order to provide a secure connection for communication via either a circuit-switched network or a packet-switched network, security keys are defined by both the user equipment, such as a mobile station, and a network entity, such as a serving GPRS support node (SGSN) in a packet-switched network and a mobile switching center (MSC) server in a circuit-switched network. However, upon handover between a packet-switched network and a circuit-switched network, there may be an initial period in which communications are conducted with no security protection, while security keys, such as a cipher key and an integrity key and the like, are provisioned in the new network, such as in a circuit-switched network in response to handover from a packet-switched network to the circuit-switched network. In this regard, while the subscriber identity module (SIM) of the user equipment, such as a mobile station, and a visitor location register (VLR) associated with an MSC server may sometimes store security keys for the circuit-switched network, such security keys for the circuit-switched network are not always stored or available. In instances in which the circuit-switched security keys are not stored, the circuit-switched security keys must be newly generated, which may result in the initial period following handover in which communications would be conducted via the circuit-switched network without security. As will be apparent, any period during which communications are unsecured is undesirable.

As such, it would be advantageous to provide an improved mechanism for providing security in a response to a handover between a packet-switched network and a circuit-switched network. In this regard, it would be desirable to provide an improved mechanism for insuring that all communications, including communications during the initial period, following a handover between a packet-switched network and a circuit-switched network are secured.

BRIEF SUMMARY OF SOME EXAMPLES OF THE INVENTION

A method, apparatus and computer program product are therefore provided to enhance security in response to a handover between a packet-switched network and a circuit-switched network. In this regard, the method, apparatus and computer program product of embodiments of the present invention may provide security keys for use in the new network following handover between a packet-switched network and a circuit-switched network such that all communications conducted via the new network, including all initial communications, may be conducted in a secure manner. Moreover, the method, apparatus and computer program product of embodiments of the present invention may be configured to provision security keys in such a manner as to avoid or limit issues relating to key replay.

In one embodiment, a method may be provided that identifies at least one security key of an initial network and a NOnce in response to a determination that a handover is to be made between a packet-switched network and a circuit-switched network. In this regard, one of the packet-switched network and the circuit-switched network is the initial network that supports communication prior to handover, while the other of the packet-switched network and the circuit-switched network is the subsequent network that will support communication subsequent to the handover. In one embodiment, the identification of the NOnce may include generating the NOnce in response to a determination that the handover is to be made. The method of this embodiment may also define at least one security key of the subsequent network based upon the at least one security key of the initial network and the NOnce.

In another embodiment, a method may be provided that identifies at least one security key of the initial network in response to a determination that a handover is to be made between a packet-switched network and a circuit-switched network. The method of this embodiment may also define at least one security key of the subsequent network to be identical to the respective security key of the initial network. The method of this embodiment may also invalidate the at least one security key of the initial network upon termination of the connection protected by the at least one security key of the initial network.

The at least one security key of each of the initial network and the subsequent network may include a cipher key and an integrity key. In addition to defining at least one security key for the subsequent network, the method of one embodiment may also define a Start value for the subsequent network, which may be set equal or identical to a Start value for the initial network.

In other embodiments of the present invention, a corresponding apparatus and a corresponding computer program product may be provided that are configured to perform the foregoing functions. In this regard, an apparatus of one embodiment may include a processor configured to identify at least one security key of the initial network and a NOnce, and to define at least one security key of the subsequent network based upon the at least one security key of the initial network and the NOnce. In accordance with another embodiment, an apparatus may be provided that may include a processor configured to identify at least one security key of the initial network, define at least one security key of the subsequent network to be identical to the respective security key of the initial network, and invalidate the at least one security key of the initial network upon termination of the connection protected by the at least one security key of the initial network. In other embodiments, an apparatus may be provided that includes means for performing the foregoing functions. Further, a computer program product may be provided according to another embodiment that includes at least one computer-readable storage medium and having computer-executable program code instructions stored therein. The computer-executable program code instructions may include program code instructions configured to perform each of the foregoing functions.

As such, embodiments of the method, apparatus and computer program products may provide for security in a subsequent network following handover between a packet-switched network and a circuit-switched network, including the provision of security immediately following the handover so as to avoid any initial period of unsecure communication within the subsequent network. Additionally, embodiments of the method, apparatus and computer program product may avoid issues associated with key replay, which may otherwise provide an opportunity via which the security of a connection can be compromised. In this regard, embodiments of the method, apparatus and computer program product may avoid key replay by generating new keys for use in the subsequent network, such as through use of a NOnce, or by using the same security keys in the subsequent network, but invalidating the security keys from further use in the initial network upon termination of the connection protected by the security keys of the initial network.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 1:
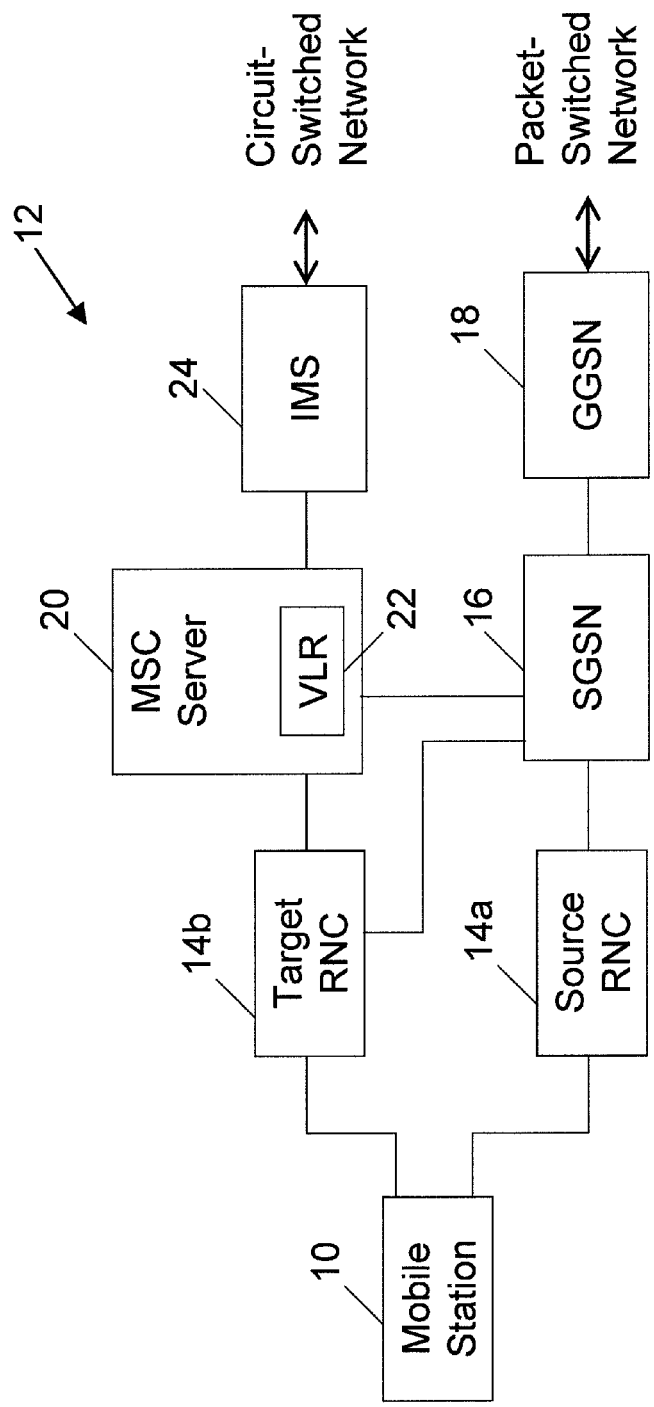
FIG. 1 illustrates a schematic block diagram of a system for supporting both a packet-switched connection and a circuit-switched connection and for facilitating handover between the packet-switched network and the circuit-switched network in accordance with embodiments of the present invention.

FIG. 4 is a flow diagram illustrating a sequence of operations for facilitating a secure handover between a packet-switched network and a circuit-switched network according to one embodiment of the present invention; and FIG. 5 is a flow diagram illustrating another sequence of operations for facilitating a secure handover between a packet-switched network and a circuit-switched network according to another embodiment of the present invention.

DETAILED DESCRIPTION OF THE INVENTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

In accordance with embodiments of the present invention, an apparatus, such as each of a mobile station and a network entity, such as an SGSN and/or an MSC server, may define at least one security key for use in a subsequent network following handover between a packet-switched network and a circuit-switched network. By way of illustration, but not of limitation, embodiments of the present invention will be described in conjunction with a handover from a packet-switched system to a circuit-switched system. However, other embodiments of the present invention may provide for the definition of at least one security key in response to a handover from a circuit-switched network to a packet-switched network.

Although embodiments of the present invention may support secure communications between various types of communications devices including both mobile and fixed devices, one example of a system including a mobile station (MS) 10 that could benefit from embodiments of the present invention is depicted in FIG. 1. While embodiments of the mobile station may be illustrated and hereinafter described for purposes of example, other types of terminals, such as portable digital assistants (PDAs), pagers, mobile televisions, mobile telephones, gaming devices, laptop computers, cameras, video recorders, audio/video player, radio, global positioning system (GPS) devices, or any combination of the aforementioned, and other types of voice and text communications systems, can employ embodiments of the present invention.

Furthermore, devices that are not mobile may also employ embodiments of the present invention.

One or more communication terminals, such as the mobile station 10, may be in communication with each other via a network 12 and each may include an antenna or antennas for transmitting signals to and for receiving signals from a radio network controller (RNC) 14a, which could be, for example, a part of one or more cellular or mobile networks. The RNC may, in turn, be connected to various different nodes, devices or functions (herein generically referenced as "network entities") that may be in communication with each other via corresponding wired and/or wireless interfaces. In order to provide packet-switched services, the RNC may in communication with an SGSN 16 which, in turn, may be in communication with a gateway GPRS support node (GGSN) 18 which may provide a gateway to the packet-switched network. While described herein the context of a UTRAN (UMTS terrestrial radio access network), the network 12 may include other types of packet-switched networks and, as such, may include other network entities as dictated by these packet-switched networks.

The network 12 may also include a circuit-switched network via which the mobile station 10 and an RNC 14b (either the same RNC as utilized in conjunction with the packet-switched network or a different RNC) may communicate. In this regard, the circuit-switched network may include an MSC server 20 in communication with the RNC. The MSC server may include the MSC and VLR functionality as partially indicated by the VLR 22 in FIG. 1. Moreover, the MSC server may be in communication with an IMS 24 for supporting circuit-switched communication between a circuit-switched network with which the IMS may be connected and the mobile station. Although the network of FIG. 1 depicts an MSC server, the MSC server may, instead, be replaced by an MSC which, in turn, may be connected to a VLR. Or, the MSC server may be in communication with an external MSC. Additionally, although the network of FIG. 1 includes a circuit-switched network having certain network entities, such as an MSC server, a VLR and an IMS, the network 12 may alternatively include other types of circuit-switched network that may include different network entities as dictated by the respective circuit-switched network.

Figure 2:
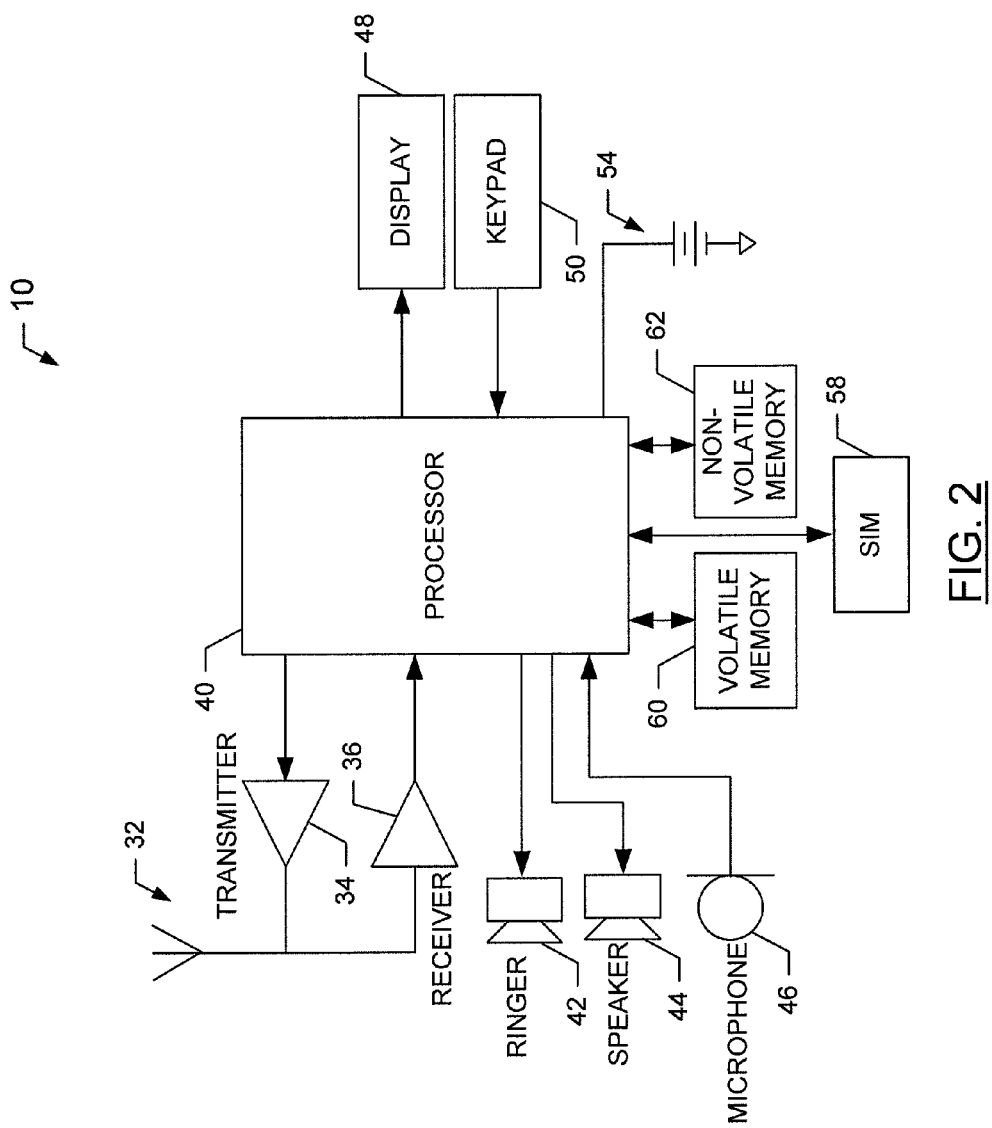
FIG. 2 is a schematic block diagram of an apparatus for defining at least one security key in a subsequent network based upon at least one security key of an initial network in accordance with embodiments of the present invention.

Although the mobile station 10 may be configured in various manners, one example of a mobile station that could benefit from embodiments of the invention is depicted in the block diagram of FIG. 2. While several embodiments of the mobile station may be illustrated and hereinafter described for purposes of example, other types of mobile stations, such as portable digital assistants (PDAs), pagers, mobile televisions, gaming devices, all types of computers (e.g., laptops or mobile computers), cameras, audio/video players, radio, global positioning system (GPS) devices, or any combination of the aforementioned, and other types of communications devices, may employ embodiments of the present invention. As described, the mobile station may include various means for performing one or more functions in accordance with embodiments of the present invention, including those more particularly shown and described herein. It should be understood, however, that a mobile station may include alternative means for performing one or more like functions, without departing from the spirit and scope of the present invention.

The mobile station 10 may include an antenna 32 (or multiple antennas) in operable communication with a transmitter 34 and a receiver 36. The mobile station may further include an apparatus, such as a processor 40, that provides signals to and receives signals from the transmitter and receiver, respectively. The signals may include signaling information in accordance with the air interface standard of the applicable cellular system, and/or may also include data corresponding to user speech, received data and/or user generated data. In this regard, the mobile station may be capable of operating with one or more air interface standards, communication protocols, modulation types, and access types. By way of illustration, the mobile station may be capable of operating in accordance with any of a number of first, second, third and/or fourth-generation communication protocols or the like. For example, the mobile station may be capable of operating in accordance with second-generation (2G) wireless communication protocols IS-136, GSM and IS-95, or with third-generation (3G) wireless communication protocols, such as UMTS, CDMA2000, wideband CDMA (WCDMA) and time division-synchronous CDMA (TD-SCDMA), with 3.9G wireless communication protocol such as E-UTRAN (evolved—UMTS terrestrial radio access network), with fourth-generation (4G) wireless communication protocols or the like.

It is understood that the apparatus, such as the processor 40, may include circuitry implementing, among others, audio and logic functions of the mobile station 10. The processor may be embodied in a number of different ways. For example, the processor may be embodied as various processing means such as a processing element, a coprocessor, a controller or various other processing devices including integrated circuits such as, for example, an ASIC (application specific integrated circuit), an FPGA (field programmable gate array), a hardware accelerator, and/or the like. In an example embodiment, the processor may be configured to execute instructions stored in a memory device or otherwise accessible to the processor. As such, the processor may be configured to perform the processes, or at least portions thereof, discussed in more detail below with regard to FIGS. 4 and 5. The processor may also include the functionality to convolutionally encode and interleave message and data prior to modulation and transmission. The processor may additionally include an internal voice coder, and may include an internal data modem.

The mobile station 10 may also comprise a user interface including an output device such as an earphone or speaker 44, a ringer 42, a microphone 46, a display 48, and a user input interface, which may be coupled to the processor 40. The user input interface, which allows the mobile station to receive data, may include any of a number of devices allowing the mobile station to receive data, such as a keypad 50, a touch display (not shown) or other input device. In embodiments including the keypad, the keypad may include numeric (0-9) and related keys (#, *), and other hard and soft keys used for operating the mobile terminal 10. Alternatively, the keypad may include a conventional QWERTY keypad arrangement. The keypad may also include various soft keys with associated functions. In addition, or alternatively, the mobile station may include an interface device such as a joystick or other user input interface. The mobile station may further include a battery 54, such as a vibrating battery pack, for powering various circuits that are used to operate the mobile station, as well as optionally providing mechanical vibration as a detectable output.

The mobile station 10 may further include a user identity module (UIM) 58, which may generically be referred to as a smart card. The UIM may be a memory device having a processor built in. The UIM may include, for example, a subscriber identity module (SIM), a universal integrated circuit card (UICC), a universal subscriber identity module (USIM), a removable user identity module (R-UIM), or any other smart card. The UIM may store information elements related to a mobile subscriber. In addition to the UIM, the mobile station may be equipped with memory. For example, the mobile station may include volatile memory 60, such as volatile Random Access Memory (RAM) including a cache area for the temporary storage of data. The mobile station may also include other non-volatile memory 62, which may be embedded and/or may be removable. The non-volatile memory may additionally or alternatively comprise an electrically erasable programmable read only memory (EEPROM), flash memory or the like. The memories may store any of a number of pieces of information, and data, used by the mobile station to implement the functions of the mobile station. For example, the memories may include an identifier, such as an international mobile equipment identification (IMEI) code, capable of uniquely identifying the mobile station. Furthermore, the memories may store instructions for determining cell id information. Specifically, the memories may store an application program for execution by the processor 40, which determines an identity of the current cell, i.e., cell id identity or cell id information, with which the mobile station is in communication.

Figure 3:
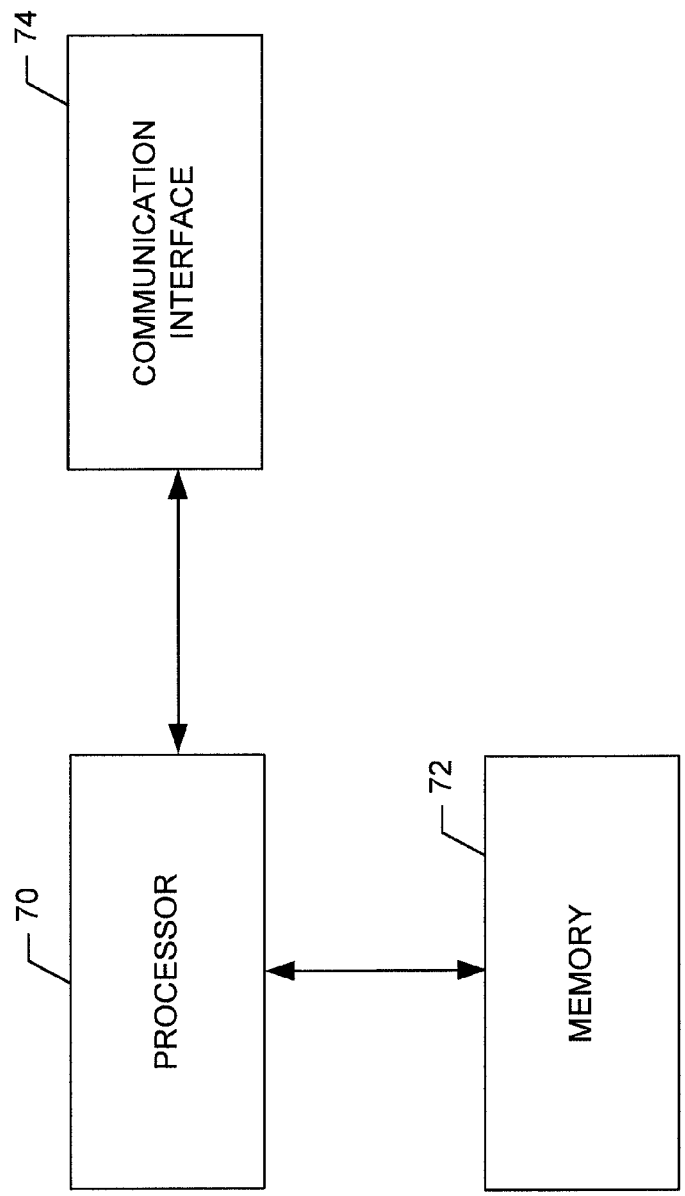
FIG. 3 is a schematic block diagram of another apparatus for defining at least one security key in a subsequent network based upon at least one security key of an initial network in accordance with embodiments of the present invention.

While a mobile station 10, such as depicted in FIG. 2, may employ embodiments of the present invention, network entities, such as an SGSN, an MSC server or the like, that are in communication with the mobile station may also employ embodiments of the present invention. Referring to FIG. 3, for example, a block diagram of a network entity capable of operating as an SGSN, an MSC server or the like is shown in accordance with one embodiment of the present invention. The network entity may include various means for performing one or more functions in accordance with embodiments of the present invention, including those more particularly shown and described herein. It should be understood, however, that the network entity may include alternative means for performing one or more like functions, without departing from the spirit and scope of the present invention.

As shown, a network entity may include means, such as a processor 70, for performing or controlling its various functions. The processor may be embodied in a number of different ways. For example, the processor may be embodied as various processing means such as a processing element, a coprocessor, a controller or various other processing devices including integrated circuits such as, for example, an ASIC, an FPGA, a hardware accelerator, and/or the like. In an example embodiment, the processor may be configured to execute instructions stored in the memory or otherwise accessible to the processor. As such, the processor may be configured to perform the processes, or at least portions thereof, discussed in more detail below with regard to FIGS. 4 and 5.

In one embodiment, the processor 70 may be in communication with or include memory 72, such as volatile and/or non-volatile memory that stores content, data or the like. For example, the memory may store content transmitted from, and/or received by, the network entity. Also for example, the memory may store software applications, instructions or the like for the processor to perform operations associated with operation of the network entity in accordance with embodiments of the present invention. In particular, the memory may store software applications, instructions or the like for the processor to perform the operations described above and below with regard to FIGS. 4 and 5 for providing security in response to a handover between a packet switched network and a circuit-switched network.

In addition to the memory 72, the processor 70 may also be connected to at least one interface or other means for transmitting and/or receiving data, content or the like. In this regard, the interface(s) can include at least one communication interface 74 or other means for transmitting and/or receiving data, content or the like, such as between the network entity and the mobile station 10 and/or between the network entity and the remainder of network 12.

In one embodiment, a mobile station 10 as shown in FIG. 2 may be in communication with a network 12 and, more particularly, with a packet-switched network. With reference to FIG. 1, for example, a mobile station 10 may be in communication with the packet-switched network via a source RNC 14*a* and, in turn, an SGSN 16 and GGSN 18, which provides a gateway to the packet-switched network in order to permit the mobile station to communicate with other network entities and/or other user terminals, such as other mobile stations, via the packet-switched network. In instances in which a handover from the packet-switched network to a circuit-switched network is to be made, such as in response to SR-VCC, the mobile station 10 and one or more network entities may take steps to provide the handover while continuing to provide secure communications via the circuit-switched network. With reference to FIG. 1, for example, a handover from the packet-switched network to the circuit-switched network would result in the mobile station communicating (following handover) with a target RNC 14*b*, which may be the same RNC as the source RNC 14*a* or may be a different RNC. The target RNC, in turn, may communicate with an MSC server 20, which, in turn, communicates with an IMS 24 which serves as a gateway to the remainder of the circuit-switched network. As shown in FIG. 1, the MSC server can include a VLR 22, along with MSC functionality. Although the network 12 of FIG. 1 is an example of a UTRAN, the network may be, instead, any other number of other networks, including a GERAN (GSM EDGE (Enhanced Data rate for GSM Evolution) Radio Access Network), EUTRAN or other radio networks. Depending upon the type of radio network, the network may include different network entities. For example, even in the UTRAN embodiment, the network may be configured differently than that depicted in FIG. 1 including, for example, the incorporation of an MSC instead of the MSC server or the addition of an MSC behind and in communication with the MSC server.

In order to handover from the packet-switched network to the circuit-switched network, a decision to handover may be made, such as by providing an SR-VCC handover signal to the source RNC 14*a*. Prior to the handover, a packet-switched connection may be maintained with the mobile station 10 and a network entity, such as the SGSN 16, storing the same set of packet-switched security keys, such as a packet-switched cipher key (CK_ps), a packet-switched integrity key (IK_ps), a Start value and a key set indicator (KSI) that identifies the key set in use. With respect to the mobile station, the packet-switched security keys may be stored by the SIM or other memory device, while the network entity, such as the SGSN, may similarly store the same packet-switched security keys in memory 72. In some instances, the mobile station, such as its SIM, and a network entity, such as the MSC server 20, may also store security keys for the circuit-switched network, such as a circuit-switched cipher key (CK_cs) and a circuit-switched integrity key (IK_cs). However, the mobile station and the network entity do not always have the circuit-switched security keys stored in memory, and, as such, these potentially pre-stored circuit-switched security keys cannot be relied upon to secure communications following handover to the circuit-switched network.

As shown in FIG. 4, in response to a determination that a handover is to be made from the packet-switched network to a circuit-switched network, a network entity of the packet-switched network may alert or otherwise advise a network entity of the circuit-switched network of the impending handover and provide the network entity of the circuit-switched network with the current packet-switched security keys. See operations 80 and 82. In the UTRAN embodiment depicted in FIG. 1, the source RNC 14a may be notified of an SR-VCC handover. The source RNC may then issue a relocation required signal to the SGSN 16 which includes the packet-switched security keys, such as CK_ps, IK_ps and the Start value as well as indicating that the relocation type is an SR-VCC handover. The SGSN and the packet-switched network may then advise the MSC server 20 of the circuit-switched network, such as by means of a forward relocation request, of the upcoming handover and the current packet-switched security keys, such as the CK_ps, IK_ps, the Start value and the KSI.

In one embodiment depicted in FIG. 4, a network entity of the circuit-switched network, such as the MSC server 20, may generate a NOnce, that is, a random value, such as a random value that is used one time, and then utilize the packet-switched security keys and the NOnce to generate circuit-switched security keys, such as CK_cs, IK_cs and a Start value. See operations 84 and 86. In this regard, the MSC server or other network entity of the circuit-switched network may generate the circuit-switched security keys and, in particular, CK_cs and IK_cs, in various manners based upon CK_ps, IK_ps and the NOnce, such as in accordance with a function of the form:

$$CK\_cs, IK\_cs = \text{function}(CK\_ps, IK\_ps, NOnce)$$

Additionally, the MSC server 20 or other network entity of the circuit-switched network may base the Start value for the circuit-switched network upon the Start value of the packet-switched network, such as by setting the Start value for the circuit-switched network equal to the Start value of the packet-switched network. In instances in which the MSC server is in communication with an external MSC and, in which, the MSC server generates the circuit-switched security keys, the MSC server may advise the MSC (or the internal MSC functionality) of the impending handover and may provide the circuit-switched security keys as well as the NOnce. The MSC (or the internal MSC functionality) may then issue a relocation request to the target RNC 14b providing the NOnce and the circuit-switched security keys, as shown in operation 88. With the circuit-switched security keys established and as shown in operation 90 of FIG. 4, the various network entities and, in turn, the mobile station 10 may then be advised to effect the handover. For example, the target RNC may acknowledge the relocation request by issuing a circuit-switched handover command that includes the NOnce and is sent to the MSC (or the internal MSC functionality). This command along with the NOnce may then be relayed from the MSC (or the internal MSC functionality) to the MSC server 20, from the MSC server to the packet-switched network, such as to the SGSN 16 and then from the SGSN to the source RNC 14a in the form of a relocation command. The source RNC may then relay the handover command including the NOnce to the mobile station 10 via a packet-switched bearer. In response, and as shown in operation 92 of FIG. 2, the mobile station and, in particular, the processor 40 of the mobile station may generate the circuit-switched security keys in the same manner as previously performed by the MSC server based upon the packet-switched security keys (that may have been stored by the SIM of the mobile station) and the NOnce provided by the source RNC. In this regard, the mobile station may generate the CK_cs, IK_cs and Start value in accordance with the same function as employed by the MSC server. Thereafter, the mobile station may communicate with the circuit-switched network to continue the communication session. See operation 94. Upon the end of the circuit-switched connection, the mobile station and the MSC server may dispose of the circuit-switched security keys if those circuit-switched security keys are still in use, as shown at operation 96.

By generating circuit-switched security keys at both the circuit-switched network entity, such as an MSC server 20, and the mobile station 10 based upon a NOnce that was generated in response to the handover command, new circuit-switched security keys may be utilized for the circuit-switched connection so as to avoid any issues with respect to key replay. Moreover, the circuit-switched security keys may be newly generated prior to commencement of the circuit-switched connection such that all circuit-switched communications may be conducted in a secure manner with no period, be it an initial period or otherwise, being unsecure.

While one embodiment of a method for generating circuit-switched security keys in response to the handover from a packet-switched network to a circuit-switched network has been described above, another embodiment is depicted in FIG. 5. In this embodiment, the packet-switched security keys are mapped directly to the circuit-switched security keys upon handover, but the packet-switched security keys are invalidated upon completion of the connection protected by the security keys of the initial network (if those security keys are still in use) so as to avoid issues with respect to key replay while again providing for all circuit-switched communications to be secured. As described in conjunction with the embodiment of FIG. 4, the mobile station 10 may initially be engaged in packet-switched communications with a packet-switched network such that the mobile station, such as its SIM, and a network entity of the packet-switched network, such as the SGSN 16, may include packet-switched security keys, such as CS_ps, IK_ps, a Start value and KSI. In response to a determination that a handover is to be made from the packet-switched network to a circuit-switched network, such as in response to the source RNC 14a receiving notification of an SR-VCC handover, a network entity of the packet-switched network may alert or otherwise advise a network entity of the circuit-switched network of the impending handover and may provide the current packet-switched security keys. See operations 100 and 102 of FIG. 5. For example, the source RNC 14a may advise the SGSN 16 of the type of required relocation, such as an SR-VCC handover, and may provide the current packet-switched security keys. The SGSN may then forward this relocation request to a network entity of the circuit-switched network, such as the MSC server 20, along with the current packet-switched security keys.

The network entity of the circuit-switched network, such as the MSC server 20, may then define the circuit-switched security keys, such as CK_cs, IK_cs and the Start value, to equal the corresponding packet-switched security keys, such as CK_ps, IK_ps and the Start value, respectively. See operation 104. In instances in which the MSC server is in communication with an external MSC and, in which, the MSC server generates the circuit-switched keys, the MSC server 20 may then signal the MSC (or the internal MSC functionality) as to the need to prepare for a handover to the circuit-switched network and may provide the circuit-switched security keys. The process can then proceed as described above in conjunction with the embodiment of FIG. 4, albeit without a NOnce value being generated or distributed. In this regard, the MSC (or the internal MSC functionality) may then provide the target RNC 14b with a relocation request and can include the circuit-switched security keys, as shown at operation 106. Since the circuit-switched security keys have been established, the various network entities and, in turn, the mobile station 10 may be advised to effect the handover. See operation 108. For example, the target RNC may acknowledge the relocation request to the MSC (or the internal MSC functionality), such as by means of a circuit-switched handover command. The MSC (or the internal MSC functionality) may, in turn, relay the circuit-switched handover command to the MSC server, the MSC server may then forward the circuit-switched handover command to the SGSN 16 and the SGSN may forward the circuit-switched handover command to the source RNC 14a. The source RNC may, in turn, forward the circuit-switched handover command to the mobile station, such as by means of a packet-switched bearer. The mobile station may then determine the circuit-switched security keys in the same manner as the network entity of the circuit-switched network, such as the MSC server, such as by defining the circuit-switched security keys to be identical to the corresponding packet-switched security keys, such as by setting CK_cs, IK_cs and the Start value to equal CK_ps, IK_ps and the Start value, respectively. See operation 110.

The circuit-switched keys may then be utilized for a circuit-switched communication conducted between the mobile station 10 and the circuit-switched network. See operation 112. Upon the end of the circuit-switched connection, the mobile station and the MSC server 20 may dispose of the circuit-switched security keys if those same circuit-switched keys are still in use, as shown at operation 114. Additionally, upon completion or termination of the connection protected by the packet-switched security keys, the packet-switched security keys may be invalidated by the mobile station and the corresponding network entity, such as the SGSN 16, if those same packet-switched security keys are still in use. See operation 116. By invalidating the packet-switched security keys, any issues with respect to key replay may be avoided, while permitting the circuit-switched keys to be utilized in order to secure all circuit-switched communications, thereby also avoiding any initial period of unsecured communications As described above, embodiments of the present invention therefore permit the security keys that will be utilized in a new domain to be based upon the security keys from a previous, different domain, so long as the integrity of the security keys is protected. This objective can be accomplished in various manners including by techniques, such as shown in FIG. 4, that insure that the security keys for the new domain are fresh by using a Nonce value, thereby providing separation between the security keys from the prior domain and the newly generated security keys so that the security keys from the prior domain are not compromised. Alternatively, as shown in FIG. 5, the security keys from the prior domain may be duplicated into the new domain, while accepting that the security keys are compromised. In this alternative embodiment, the compromised keys may be invalidated when the connection being protected by the compromised keys comes to an end, if in fact those same keys are still in use. However, if the network replaces the compromised keys prior to the end of the connection, the compromised keys are out of use so nothing further need be done upon the connection coming to an end. As also noted above, any security keys mapped or copied from a prior domain to a new domain may only be used for the current connection and may be disposed of at the end of the connection, if the security keys are still in use at that time, e.g., these security keys are not stored for use with any further connections.

As described above, FIGS. 4 and 5 are flowcharts of an apparatus, method and program product according to some exemplary embodiments of the invention. It will be understood that each block of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile station 10, network entity or other apparatus employing embodiments of the present invention and executed by a processor in the mobile station, network entity or other apparatus. In this regard, the operations described above in conjunction with the diagrams of FIGS. 4 and 5 may have been described as being performed by the mobile station, the RNC(s) 14, the SGSN 16, and/or the MSC server 10, but any or all of the operations may actually be performed by the respective processors of these entities, for example in response to computer program instructions executed by the respective processors. As will be appreciated, any such computer program instructions may be loaded onto a computer or other programmable apparatus (i.e., hardware) to produce a machine, such that the instructions which execute on the computer (e.g., via a processor) or other programmable apparatus create means for implementing the functions specified in the flowcharts block(s). These computer program instructions may also be stored in a computer-readable memory that can direct a computer (e.g., the processor or another computing device) or other programmable apparatus to function in a particular manner, such that the instructions stored in the computer-readable memory produce an article of manufacture including instruction means which implement the function specified in the flowcharts block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide for implementation of the functions specified in the flowcharts block(s).

Accordingly, blocks of the flowcharts support combinations of means for performing the specified functions and program instruction means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In an exemplary embodiment, an apparatus for performing the method of FIGS. 4 and 5 may include a processor (e.g., the processor(s) 40 and/or 70) configured to perform some or each of the operations (80-114) described above. The processor(s) may, for example, be configured to perform the operations (80-114) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 80-114 may comprise, for example, the processor(s) 40 and/or 70 as described above.

Many modifications and other embodiments of the inventions set forth herein will come to mind to one skilled in the art to which these inventions pertain having the benefit of the teachings presented in the foregoing descriptions and the associated drawings. For example, while embodiments of the present invention have been described in conjunction with the handover from a packet-switched network to a circuit-switched network, other embodiments of the present invention facilitate handover from a circuit-switched network to a packet-switched network in a comparable manner to that described above with a network entity of the packet-switched network, such as the SGSN 16, defining the packet-switched security keys based upon the circuit-switched security keys and, in one embodiment, a NOnce generated by the network entity of the packet-switched network. Further, while embodiments of the present invention have been described in conjunction with a system architecture depicted in FIG. 1 for supporting UTRAN, such a system architecture and radio network are merely provided for purposes of example and other system architectures and corresponding radio networks including, for example, GERAN and EUTRAN, may also benefit from embodiments of the present invention with the other system architectures potentially including other network entities for performing the functions described above. Additionally, although the system architecture of FIG. 1 includes both a source RNC 14a and a target RNC 14b, the network 12 may include a single RNC that functions as both the source RNC and the target RNC in other embodiments.

Therefore, it is to be understood that the inventions are not to be limited to the specific embodiments disclosed and that modifications and other embodiments are intended to be encompassed. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the present invention. In this regard, for example, different combinations of elements and/or functions than those explicitly described above are also contemplated to be within embodiments of the present invention. Although specific terms are employed herein, they are used in a generic and descriptive sense only and not for purposes of limitation.

What is claimed is:

1. A method comprising:
   determining that a handover is to be made between a packet-switched network and a circuit-switched network, wherein the handover is from an initial network that supports communication prior to handover and is comprised of one of the packet-switched network and the circuit-switched network to a subsequent network that supports communication following handover and comprised of another one of the packet-switched network and the circuit-switched network;
   identifying at least one security key of the initial network and a nonce in response to determining that the handover is to be made; and
   generating at least one security key of the subsequent network at least partially based upon the at least one security key of the initial network and the nonce.

2. A method according to claim 1 wherein identifying the nonce comprises generating the nonce in response to determining that the handover is to be made.

3. A method according to claim 1 wherein generating the at least one security key comprises generating at least one of a cipher key, an integrity key or a start value.

4. A method according to claim 1 wherein determining that the handover is to be made comprises receiving a notification that the handover is to be made, and wherein identifying at least one security key of the initial network comprises receiving the at least one security key of the initial network.

5. A method according to claim 1 wherein determining that the handover is to be made comprises receiving a notification that the handover is to be made, and wherein identifying at least one security key of the initial network comprises accessing the at least one security key of the initial network from memory.

6. A method according to claim 1 further comprising directing alerting of another entity of the handover from the initial network to the subsequent network and directing provision of the nonce to the another entity.

7. An apparatus comprising at least one processor and at least one memory storing computer program code, wherein the at least one memory and stored computer program code are configured, with the at least one processor, to cause the apparatus at least to:
   determine that a handover is to be made between a packet-switched network and a circuit-switched network, wherein the handover is from an initial network that supports communication prior to handover and is comprised of one of the packet-switched network and the circuit-switched network to a subsequent network that supports communication following handover and comprised of another one of the packet-switched network and the circuit-switched network;
   identify at least one security key of the initial network and a nonce in response to determining that the handover is to be made; and
   generate at least one security key of the subsequent network at least partially based upon the at least one security key of the initial network and the nonce.

8. An apparatus according to claim 7 wherein the at least one memory and stored computer program code are configured, with the at least one processor, to identify the nonce by generating the nonce in response to determining that the handover is to be made.

9. An apparatus according to claim 7 wherein the at least one memory and stored computer program code are configured, with the at least one processor, to generate the at least one security key by generating at least one of a cipher key, an integrity key or a start value.

10. An apparatus according to claim 7 wherein the at least one memory and stored computer program code are configured, with the at least one processor, to determine that the handover is to be made by receiving a notification that the handover is to be made, and to identify at least one security key of the initial network by receiving the at least one security key of the initial network.

11. An apparatus according to claim 7 wherein the at least one memory and stored computer program code are configured, with the at least one processor, to determine that the handover is to be made by receiving a notification that the handover is to be made, and to identify at least one security key of the initial network by accessing the at least one security key of the initial network from memory.

12. An apparatus according to claim 7 wherein the at least one memory and stored computer program code are further configured, with the at least one processor, to direct alerting of another entity of the handover from the initial network to the subsequent network and direct provision of the nonce to the another entity.

13. An apparatus according to claim 7 wherein is embodied in at least one of a mobile station or a network entity.

14. A computer program product comprising a non-transitory computer readable storage medium having computer executable program instructions embodied in the medium, the computer executable program instructions comprising:
   instructions configured to determine that a handover is to be made between a packet-switched network and a circuit-switched network, wherein the handover is from an initial network that supports communication prior to handover and is comprised of one of the packet-switched network and the circuit-switched network to a subsequent network that supports communication following handover and comprised of another one of the packet-switched network and the circuit-switched network;
instructions configured to identify at least one security key of the initial network and a nonce in response to determining that the handover is to be made; and
instructions configured to generate at least one security key of the subsequent network at least partially based upon the at least one security key of the initial network and the nonce.

15. A computer program product according to claim 14 wherein the instructions configured to identify the nonce comprise instructions configured to generate the nonce in response to determining that the handover is to be made.

16. A computer program product according to claim 14 wherein the instructions configured to generate the at least one security key comprise instructions configured to generate at least one of a cipher key, an integrity key or a start value.

17. A computer program product according to claim 14 wherein the instructions configured to determine that the handover is to be made comprises instructions configured to receive a notification that the handover is to be made, and wherein the instructions configured to identify at least one security key of the initial network comprises instructions configured to receive the at least one security key of the initial network.

18. A computer program product according to claim 14 wherein the instructions configured to determine that the handover is to be made comprises instructions configured to receive a notification that the handover is to be made, and wherein the instructions configured to identify at least one security key of the initial network comprises instructions configured to access the at least one security key of the initial network from memory.

19. A computer program product according to claim 14 further comprising instructions configured to direct alerting of another entity of the handover from the initial network to the subsequent network and instructions configured to direct provision of the nonce.

20. An apparatus including a processor coupled to a memory comprising:
means for determining that a handover is to be made between a packet-switched network and a circuit-switched network, wherein the handover is from an initial network that supports communication prior to handover and is comprised of one of the packet-switched network and the circuit-switched network to a subsequent network that supports communication following handover and comprised of another one of the packet-switched network and the circuit-switched network;
means for identifying at least one security key of the initial network and a nonce in response to determining that the handover is to be made; and
means for generating at least one security key of the subsequent network at least partially based upon the at least one security key of the initial network and the nonce.

\* \* \* \* \*